United States Patent
Boysen et al.

(10) Patent No.: US 9,225,754 B2
(45) Date of Patent: Dec. 29, 2015

(54) AD-HOC NETWORK COMMUNICATIONS

(75) Inventors: Andre Michel Boysen, Huntsville (CA); Patrick Hans Engel, Richmond Hill (CA); Troy Jacob Ronda, Toronto (CA); Pierre Antoine Roberge, Toronto (CA); Gregory Howard Wolfond, North York (CA)

(73) Assignee: SECUREKEY TECHNOLOGIES INC., Toronto (CA)

( * ) Notice: Subject to any disclaimer, the term of this patent is extended or adjusted under 35 U.S.C. 154(b) by 57 days.

(21) Appl. No.: 14/002,824

(22) PCT Filed: Mar. 5, 2012

(86) PCT No.: PCT/CA2012/000225
§ 371 (c)(1),
(2), (4) Date: Sep. 3, 2013

(87) PCT Pub. No.: WO2012/116441
PCT Pub. Date: Sep. 7, 2012

(65) Prior Publication Data
US 2013/0346753 A1 Dec. 26, 2013

Related U.S. Application Data

(60) Provisional application No. 61/448,955, filed on Mar. 3, 2011.

(51) Int. Cl.
*H04L 29/06* (2006.01)
*H04L 9/08* (2006.01)
*H04L 9/32* (2006.01)
*G06Q 30/06* (2012.01)
*H04L 29/08* (2006.01)

(52) U.S. Cl.
CPC ............ *H04L 65/1069* (2013.01); *G06Q 30/06* (2013.01); *H04L 9/0863* (2013.01); *H04L9/3263* (2013.01); *H04L 29/06* (2013.01); *H04L 67/141* (2013.01); *H04L 63/08* (2013.01); *H04L 63/0807* (2013.01); *H04L 63/0823* (2013.01); *H04L 67/24* (2013.01); *H04L 2209/56* (2013.01)

(58) Field of Classification Search
USPC ........................... 713/168; 709/227, 228, 241
See application file for complete search history.

(56) References Cited

U.S. PATENT DOCUMENTS 5,586,260 A * 12/1996 Hu .................................. 726/12
2005/0059379 A1 * 3/2005 Sovio et al. ................... 455/411

FOREIGN PATENT DOCUMENTS

| EP | 1916607 A1 | 4/2008 |
| WO | 2009132446 A1 | 11/2009 |
| WO | 2010094125 A1 | 8/2010 |
| WO | 2011066658 A1 | 6/2011 |

OTHER PUBLICATIONS

Int'l Search Report issued Jun. 27, 2012 in Int'l Application No. PCT/CA2012/000225.

* cited by examiner

*Primary Examiner* — Samuel Ambaye
(74) *Attorney, Agent, or Firm* — Bereskin & Parr LLP/S.E.N.C.R.L., s.r.l.

(57) ABSTRACT

A method of ad-hoc network communications comprises a computer server transmitting a communications session request to a primary logical communications device of a logical ad-hoc communications network. The logical ad-hoc communications network comprises the primary logical communications device and at least one secondary logical communications device that is registered to the primary logical communications device. The communications session request requests a communications session with one of the at least one secondary logical communications devices. Upon receipt of the communications session request, the primary logical communications device transmits to the one secondary logical communications device a session initiate message requesting the one secondary logical communications device initiate the communications session with the computer server. The one secondary logical communications device replies to the computer server with a communications session reply initiating the communications session and identifying the one secondary logical communications device to the computer server.

17 Claims, 7 Drawing Sheets

AD-HOC NETWORK COMMUNICATIONS

CROSS-REFERENCE TO RELATED APPLICATION

This application is a Section 371 of International Application No. PCT/CA2012/000225, filed Mar. 3, 2012, which was published in the English language on Sep. 7, 2012, under International Publication No. WO 2012/116441 A1, and the disclosure of which is incorporated herein by reference.

This patent application claims the benefit of the filing date of U.S. patent application No. 61/448,955, filed Mar. 3, 2011, entitled "Secure Distributed Computing Mesh".

FIELD

This patent application relates to a method and system for communicating with communications devices of an ad-hoc communications network.

BACKGROUND

Computer user may use a web browser on the user's personal computer to complete an online transaction (e.g. effect payment for goods/services, transfer funds between financial accounts or institutions) at a website. However, rogue software installed on the personal computer may be designed to wait until the end-user successfully authenticates to the website, and to intercept and manipulate transaction data (e.g. payment amount, financial account) transmitted from the browser before it reaches the website and/or confirmation data (e.g. payment amount, financial account, merchant name) transmitted from the website before it reaches the browser. For example, the rogue software may change the transaction data transmitted from the browser to instruct the website to transfer "$5000 to account Y" instead of the intended transfer of "$500 to account X". To prevent the end-user from immediately detecting the altered transaction, the rogue software may also modify the confirmation data transmitted from the website to confirm the intended transfer of "$500 to account X" instead of the actual transfer of "$5000 to account Y".

SUMMARY

By way of overview, in a first aspect this disclosure relates to a method of ad-hoc network communications. The method involves a computer server transmitting a communications session request to a primary logical communications device of a logical ad-hoc communications network. The logical ad-hoc communications network comprises the primary logical communications device and at least one secondary logical communications device registered to the registered to the primary logical communications device. The communications session request requests a communications session with one of the at least one secondary logical communications devices.

Upon receipt of the communications session request, the primary logical communications device transmits to the one secondary logical communications device a session initiate message that requests the one secondary logical communications device initiate the communications session with the computer server. The one secondary logical communications device replies to the computer server with a communications session reply that initiates the communications session and identifies the one secondary logical communications device to the computer server.

In a second aspect, this disclosure relates to a logical ad-hoc communications network that includes a primary logical communications device and at least one secondary logical communications device registered to the primary logical communications device. The primary logical communications device is configured to transmit to the one secondary logical communications device (after receiving from a computer server a communications session request that requests a communications session with one of the at least one secondary logical communications devices) a session initiate message that requests the one secondary logical communications device initiate the communications session with the computer server. The one secondary logical communications device is configured to reply to the computer server with a communications session reply that initiates the communications session and identifies the one secondary logical communications device to the computer server.

In a third aspect, this disclosure relates to a (primary) logical communications device of a logical ad-hoc communications network that comprises another logical communications device registered to the (primary) logical communications device. The (primary) logical communications device includes a session controller that is configured to receive from a computer server a communications session request that requests a communications session with the other logical communications devices. The (primary) logical communications device is also configured to transmit to the other logical communications device a session initiate message that requests the other logical communications device initiate the communications session with the computer server and identify the other logical communications device to the computer server.

In a fourth aspect, this disclosure relates to a computer-readable medium that carries computer processing instructions stored thereon for execution by one logical communications device of a logical ad-hoc communications network that comprises at least another logical communications device that is registered to the one logical communications device. The computer processing instructions, when executed by the one logical communications device, configure the one logical communications device to transmit to the another logical communications device (after receiving from a computer server a communications session request that requests a communications session with the another logical communications device) a session initiate message that requests the another logical communications device initiate the communications session with the computer server and identify the another logical communications device to the computer server.

In a fifth aspect, this disclosure relates to a (secondary) logical communications device that is registered to another logical communications device of a logical ad-hoc communications network. The (secondary) logical communications device includes a session client that is configured to receive from the another logical communications device a session initiate message that requests the (secondary) logical communications device initiate a communications session with a computer server, and is further configured to initiate the communications session with the computer server and identify the (secondary) logical communications device to the computer server. Preferably, the session initiate message includes a session key, and the session client is configured to initiate the communications session using the session key to open a secure communications channel with the computer server.

In a sixth aspect, this disclosure relates to a computer-readable medium that carries computer processing instructions stored thereon for execution by one logical communications device of a logical ad-hoc communications network that comprises another logical communications device. The one logical communications device is registered to the another logical communications device. The computer processing instructions, when executed by the one logical communications device, configure the one logical communications device to (after receiving from the another logical communications device a session initiate message requesting the one logical communications device initiate a communications session with a computer server) initiate the communications session with the computer server and identify the one logical communications device to the computer server. Preferably, the session initiate message includes a session key, and the computer processing instructions configure the one logical communications device to initiate the communications session using the session key to open a secure communications channel with the computer server.

BRIEF DESCRIPTION OF THE DRAWINGS

The foregoing aspects of the disclosure will now be described, by way of example, with reference to the accompanying drawings, in which.

DETAILED DESCRIPTION

Transaction Network

Figure 1:
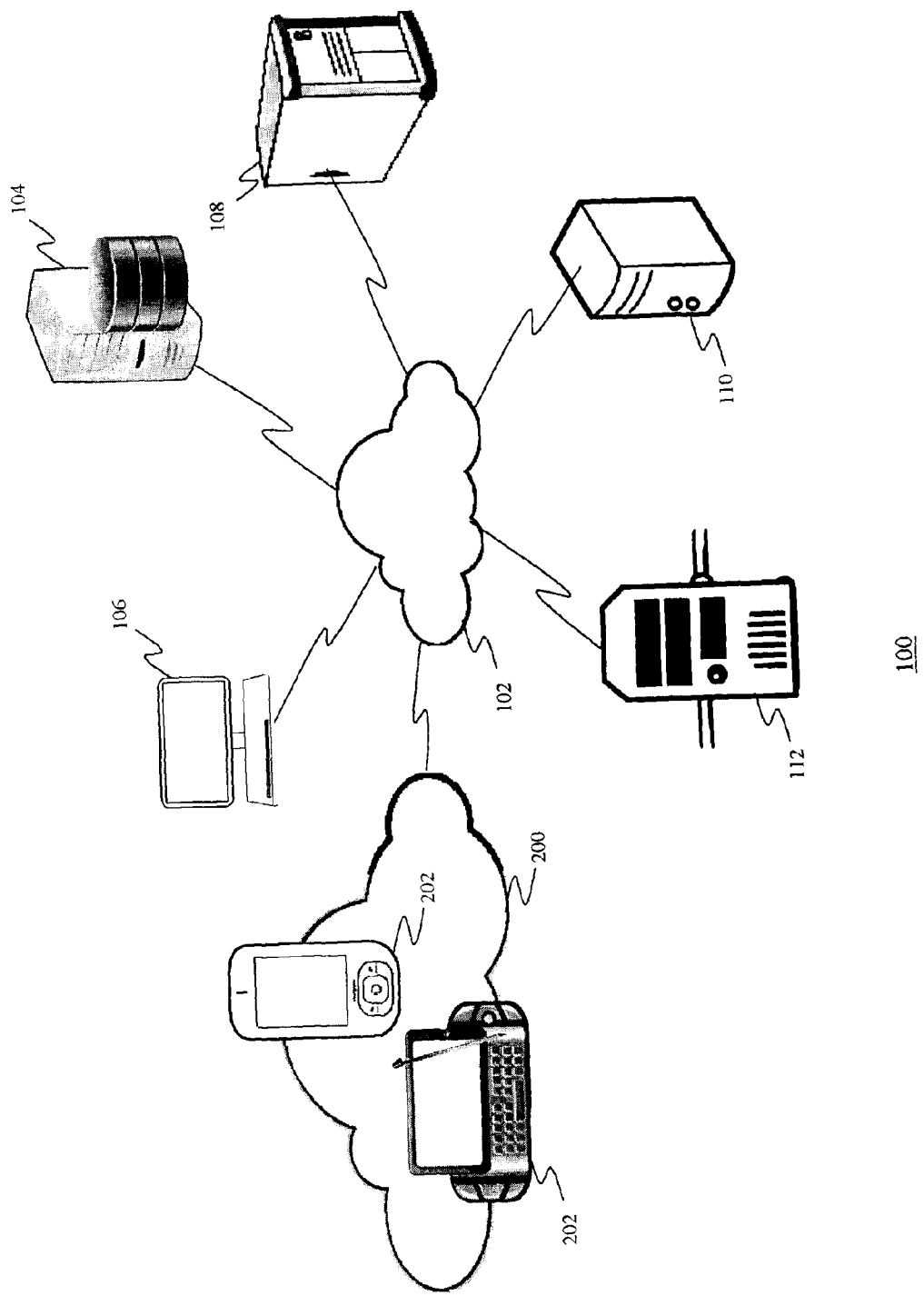
FIG. 1 is a schematic view of a transaction network, which includes a Relying Party Server and the logical ad-hoc communications network.

Turning to FIG. 1, there is shown a transaction network, denoted generally by reference numeral 100, that comprises a communications network 102, one or more Relying Party Servers 104, and a logical ad-hoc communications network 200. The transaction network 100 may also include one or more Computer Hosts 106, an Application Server 108, a User Identity Provider (UIP) Server 110, and a Presence Server 112, all configured to communicate with the ad-hoc network 200 via the communications network 102.

The communications network 102 may typically comprises a wide-area network (such as the Internet), and may be implemented as a wired network (e.g. IEEE 802.3), a wireless network (IEEE 802.11, Bluetooth), or a combination of wired and wireless networks. Accordingly, although the Relying Party Server 104, Computer Host 106, Application Server 108, UIP Server 110, and Presence Server 112 are shown interconnected by a single common communications network 102, the communications network 102 itself may comprise one or more distinct communications networks.

Relying Party Server

Preferably, the Relying Party Server 104 is deployed on a computer web server, and comprises application software, a User-Controller database, and a Relying Party certificate/key store. The application software interfaces with the User-Controller database and the Relying Party certificate/key store, and communicates with the Computer Host 106, the Application Server 108, the User Identity Provider (UIP) Server 110 and the ad-hoc communications network 200 via the communications network 102.

The User-Controller database includes a plurality of user-controller profile's, each associated with a respective end-user of the ad-hoc communications network 200. Each user-controller profile may include end-user authentication data which the Relying Party Server 104 can use to authenticate the end-user. As examples, the Relying Party Server 104 may use the end-user authentication data to authenticate a card cryptogram, public certificate, chip & PIN, and/or userID & password received from an end-user. Further, a Controller Registration process implemented by the ad-hoc communications network 200 causes the user-controller profiles to be populated with a User-Relying Party handle IDForRP which the ad-hoc communications network 200 can use to authenticate to the Relying Party Server 104.

The Relying Party certificate/key store includes a Relying Party Public Certificate RPPubC and a Relying Party private encryption key RPPrivK. The Relying Party Public Certificate RPPubC includes a unique identifier RPID and a Relying Party public encryption key RPPubK. Preferably, the Relying Party public encryption key RPPubK and the Relying Party private encryption key RPPrivK comprise an asymmetric encryption key pair and are uniquely associated with the Relying Party Server 104. The Relying Party Public Certificate RPPubC may be signed by a Root Certificate Authority.

Computer Host

The Computer Host 106 comprises a networked computing device, and may be implemented as a personal computer/tablet, a data messaging device (e.g. two-way pager), or a wireless Internet appliance (e.g. smart-phone), as examples. The Computer Host 106 is configured with an operating system, a web browser, and a Host certificate/key store. The web browser interfaces with the Host certificate/key store, and communicates with the Relying Party Server 104, the Application Server 108, the User Identity Provider (UIP) Server 110 and the ad-hoc communications network 200 via the communications network 102.

The Host certificate/key store includes a Host Public Certificate HPubC and a Host Private Key HPrivK. The Host Public Certificate HPubC includes a Host public encryption key HPubK. Preferably, the Host public encryption key HPubK and the Host private encryption key HPrivK comprise an asymmetric encryption key pair and are uniquely associated with the Computer Host 106. The Host Public Certificate HPubC may be signed by a Root Certificate Authority.

User Identity Provider Server

Preferably, the User Identity Provider (UIP) Server 110 is deployed on a computer web server, and comprises application software, a Registered User database, and a UIP certificate/key store. The application software interfaces with the Registered User database and the UIP certificate/key store, and communicates with the Relying Party Server 104, the Computer Host 106 and the ad-hoc communications network 200 via the communications network 102.

The Registered User database includes a plurality of user profiles, each associated with a respective end-user of the ad-hoc communications network 200. Each user profile may include end-user authentication data which the UIP Server 110 can use to authenticate the end-user. As examples, the UIP Server 110 may use the end-user authentication data to authenticate a card cryptogram, public certificate, chip & PIN, and/or userID & password received from an end-user. Further, each user profile includes the Relying Party Public Certificate(s) RPPubC of the Relying Party Server(s) 104 that the respective end-user is authorized to access. As discussed above, each Relying Party Public Certificate RPPubC includes the unique identifier RPID of the associated Relying Party Server 104.

The UIP Server certificate/key store includes a UIP Server Public Certificate UIPPubC and a UIP Server Private Key UIPPrivK. The UIP Server Public Certificate UIPPubC includes a UIP Server public encryption key UIPPubK. Preferably, the UIP Server public encryption key UIPPubK and the UIP Server private encryption key UIPPrivK comprise an asymmetric encryption key pair and are uniquely associated with the Application Server 108. The UIP Public Certificate UIPPubC may be signed by a Root Certificate Authority.

Application Server

Preferably, the Application Server 108 is deployed on the same web server as the Relying Party Server 104, and comprises application software and an Application Server certificate/key store. Alternately, the Application Server 108 may be deployed on a separate web server than the Relying Party Server 104. The application software interfaces with the Application Server certificate/key store, and communicates with the Computer Host 106, the Relying Party Server 104, the User Identity Provider (UIP) Server 110 and the ad-hoc communications network 200 via the communications network 102.

The Application Server certificate/key store includes an Application Server Public Certificate ASPubC and an Application Server Private Key ASPrivK. The Application Server Public Certificate HPubC includes an Application Server public encryption key ASPubK. Preferably, the Application Server public encryption key ASPubK and the Application Server private encryption key ASPrivK comprise an asymmetric encryption key pair and are uniquely associated with the Application Server 108. The Application Server Public Certificate ASPubC may be signed by a Root Certificate Authority.

Preferably, the Application Server 108 has access to the User-Controller database of the Relying Party Server 104 and/or the Registered User database of the User Identity Provider (UIP) Server 110 so as to allow the Application Server 108 to authenticate an end-user from end-user authentication data.

Presence Server

The Presence Server 112 is implemented as a computer server, and is configured to facilitate communication between various devices of the ad-hoc communications network 200, or between the Computer Host 106 and devices of the ad-hoc communications network 200, when a direct connection therebetween is not possible. As will become apparent, the Presence Server 112 differs from conventional presence servers in that, instead of allowing users to find each other, the Presence Server 112 uses unique device identifiers to allow various devices of the ad-hoc communications network 200 to locate and connect to each other when they are available.

Logical Ad-Hoc Communications Network

Figure 3:
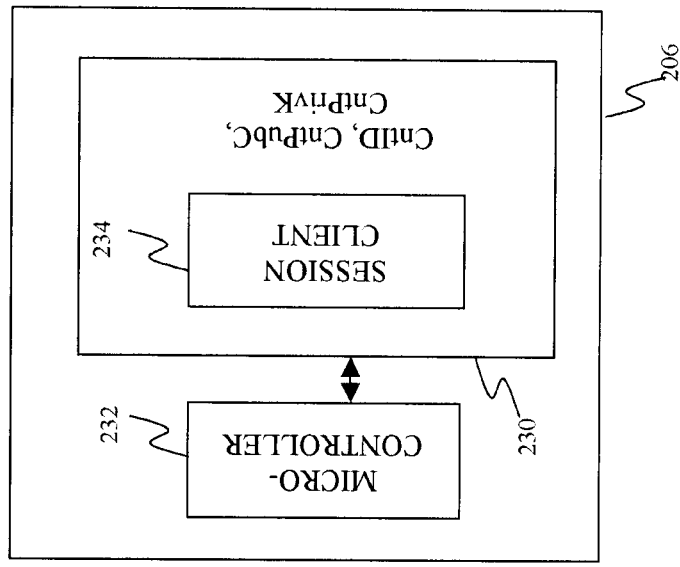
FIG. 3 is a schematic view of one of the secondary logical communications devices of the logical ad-hoc communications network.

The logical ad-hoc communications network 200 comprises one or more physical communications devices 202, a primary logical communications device 204 (see FIG. 2), and one or more secondary logical communications devices 206 (see FIG. 3). Each physical communications device 202 comprises any input and/or output communications device that is capable of allowing the logical communications devices 204, 206 to perform any of the processes described herein. As non-limiting examples, the physical communications devices 202 may be implemented as wired or wireless keyboards/keypads, NFC readers, RFID readers, computer pointing devices, hardware (e.g. USB) tokens, data messaging/display devices, two-way pagers, wireless e-mail devices, wired or wireless telephones, wireless Internet appliances, personal computers/tablets, and/or wired or wireless point-of-sale terminals.

The logical communications devices 204, 206 are deployed on the physical communications devices 202. The primary logical communications device 204 is configured to communicate with one or more of the secondary logical communications devices 206, and optionally to also communicate with one or more of the Computer Hosts 106, the Application Server 108, the User Identity Provider Server 110 and the Presence Server 112. The secondary logical communications devices 206 are configured to communicate with the primary logical communications device 204 and to initiate communications sessions with a computer server (e.g. the Application Server 108).

As will be discussed in greater detail below, the logical ad-hoc communications network 200 implements a method of ad-hoc network communications in which a computer server (e.g. the Application Server 108) transmits to the primary logical communications device 204 a communications session request requesting a communications session with one or more of the secondary logical communications devices 206 that are registered to the primary logical communications device 204. Upon receipt of the communications session request, the primary logical communications device 204 transmits to the secondary logical communications device 206 a session initiate message in which the primary logical communications device 204 requests that the secondary logical communications device 206 initiate the requested communications session with the computer server. The secondary logical communications device 206 replies to the computer server with a communications session reply that initiates the requested communications session and preferably also identifies the secondary logical communications device 206 to the computer server.

The logical ad-hoc communications network 200 has a topology in which its physical architecture may be distinct from its logical architecture. Therefore, the logical communications devices 204, 206 may all be deployed on a single common physical communications device 202. Alternately, the functionality of the logical communications devices 204, 206 may be deployed amongst multiple physical communications devices 202. For example, the primary logical communications device 204 may be deployed on one physical communications device 202, and one or more secondary logical communications devices 206 may be deployed on one or more other physical communications devices 202. Alternately, the primary logical communications device 204 and one or more secondary logical communications devices 206 may be deployed on a common physical communications device 202, and further secondary logical communications devices 206 may be deployed on one or more other physical communications devices 202.

The logical communications device 204, 206 and may be implemented as electronic circuitry, computer processing instructions or a combination thereof. Preferably, one or more of the logical communications device 204, 206 is implemented as computer processing instructions that are stored in a secure computer processing environment of the associated physical communications device 202.

Figure 2:
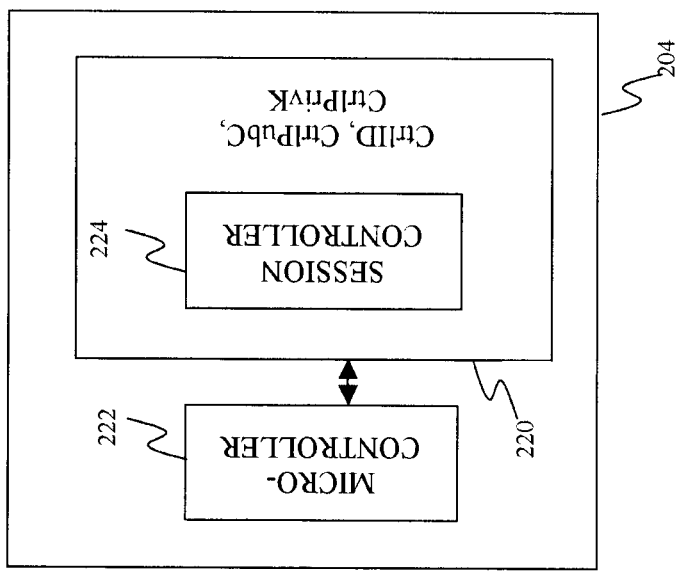
FIG. 2 is a schematic view of one of the primary logical communications devices of the logical ad-hoc communications network.

As shown in FIG. 2, the secure computer processing environment of the primary logical communications device 204 may comprise a protected memory 220 that stores cryptographic and proprietary algorithms, and an associated microcontroller 222 (or crypto-processor) that executes the cryptographic and proprietary algorithms that are stored in the protected memory 220. Preferably, the proprietary algorithms include computer processing instructions which, when executed by the associated microcontroller 222, define in the primary logical communications device 204 a session controller 224 that is configured to perform a Session Initiation procedure in which the session controller 224 receives a communications session request from a computer server requesting a communications session with one of secondary logical communications devices 206, and transmits to the secondary logical communications device 206 a session initiate message that requests the secondary logical communications device 206 initiate the communications session with the computer server and identify the secondary logical communications device 206 to the computer server. Although the session controller 224 is preferably implemented as computer processing instructions within the secure computer processing environment, the session controller 224 may also be implemented as electronic circuitry of the primary logical communications device 204.

The proprietary algorithms of the primary logical communications device 204 may also include computer processing instructions which, when executed by the associated microcontroller 222, configure the primary logical communications device 204 to perform a Controller Registration procedure and a Client Binding procedure. As will be described below, the primary logical communications device 204 may execute the Controller Registration procedure to thereby register the primary logical communications device 204 with one or more of the Relying Party Servers 104.

The protected memory 220 may also store a controller identifier CtrlID that is uniquely associated with the primary logical communications device 204. The controller identifier CtrlID may comprise, for example, a static identifier, a cryptographic key, or a public certificate signed by a certificate authority. The primary logical communications device 204 may use the unique controller identifier CtrlID to register the primary logical communications device 204 with the Relying Party Servers 104 during the Controller Registration procedure.

The protected memory 220 may also store a Controller Public Certificate CtrlPubC and a corresponding Controller private encryption key CtrlPrivK. The Controller Public Certificate CtrlPPubC may identify the intended end-user of the primary logical communications device 204, and includes the Controller identifier CtrlID and a Controller public encryption key CtrlPubK. Preferably, the Controller public encryption key CtrlPubK and the Controller private encryption key CtrlPrivK comprise an asymmetric encryption key pair and are uniquely associated with the primary logical communications device 204. The session controller 224 may use the controller cryptographic keys to establish a secure communications channel with the secondary logical communications devices 206.

The Controller identifier CtrlID, the Controller Public Certificate CtrlPubC, and the Controller private encryption key CtrlPrivK may have been installed in the protected memory 220 during a manufacturing stage of the associated physical communications device 202, or may have been installed in the protected memory 220 during an activation procedure that is executed after delivery of the physical communications device 202 to the end-user.

As shown in FIG. 3, the secure computer processing environment of the secondary logical communications device 206 may comprise a protected memory 230 that stores cryptographic and proprietary algorithms, and an associated microcontroller 232 (or crypto-processor) that executes the cryptographic and proprietary algorithms that are stored in the protected memory 230. Preferably, the proprietary algorithms include computer processing instructions which, when executed by the associated microcontroller 232, define in the secondary logical communications device 206 a session client 234 that is configured to perform a Session Initiation procedure in which the session client 234 receives from the primary logical communications device 204 a session initiate message requesting the secondary logical communications device 206 initiate a communications session with a computer server, and transmits to the computer server a communications session reply that initiates the communications session and identifies the secondary logical communications device 206 to the computer server.

The proprietary algorithms of the secondary logical communications devices 206 may also include computer processing instructions which, when executed by the associated microcontroller 232, configure the secondary logical communications device 206 to perform a Client Binding procedure. As will be described below, each secondary logical communications device 206 may execute the Client Binding procedure to thereby register the secondary logical communications device 206 with the primary logical communications device 204.

The protected memory 230 may also store a client identifier CntID that is uniquely associated with the secondary logical communications device 206. The client identifier CntID may comprise, for example, a static identifier, a cryptographic key, or a public certificate signed by a certificate authority. The secondary logical communications device 206 may use the unique client identifier CntID to authenticate the secondary logical communications device 206 to the primary logical communications device 204 during the Client Binding procedure. The session client 234 may also use the unique client identifier CntID to authenticate the secondary logical communications device 206 to the computer server, as will be discussed below.

The protected memory 230 may also store a Client Public Certificate CntPubC and a corresponding Client private encryption key CntPrivK. The Client Public Certificate CntPubC includes the Client identifier CntID and a Client public encryption key CntPubK. Preferably, the Client public encryption key CntPubK and the Client private encryption key CntPrivK comprise an asymmetric encryption key pair and are uniquely associated with the secondary logical communications device 206. The session client 234 may use the client cryptographic keys to establish a secure communications channel with the computer server. The client identifier CntID and the client cryptographic keys are typically installed in the protected memory 230 during a manufacturing stage of the associated physical communications device 202.

As will be discussed below, preferably the session initiate message includes a session key, and the session client 234 is configured to initiate the communications session by using the session key to open a secure communications channel with the computer server. Further, the session controller 224 typically receives the communications session request from the Application Server 108, and the session initiate message typically requests that the session client 234 initiate the communications session with the Application Server 108. However, these configurations of the session controller 224, the session clients 234 and the session initiate message are not so limited. The session controller 224 may be configured to request that the session client 234 initiate communication with any network device that may be reachable by the secondary logical communications device 206, whether or not the network device is specified by the Application Server 108. Similarly, the session clients 234 may be configured to initiate communication with any network device that may be reachable by the secondary logical communications device 206, whether or not the network device is specified by the session initiate message.

As will become apparent, an advantage of the ad-hoc communications network 200 is that the primary logical communications device 204 need not be registered with the Application Server 108 before the Application Server 108 transmits the communications session request to the primary logical communications device 204. Instead, the primary logical communications device 204 can authenticate to the Application Server 108 prior to or after receipt of the communications session request. Alternately, the end-user can authenticate to the Application Server 108 by providing satisfactory user credentials (e.g. a card cryptogram, public certificate, chip & PIN, userID & password). The primary logical communications device 204 then facilitates communication between the secondary logical communications devices 206 and the Application Server 108.

Another advantage of the ad-hoc communications network 200 is that the end-user need not have any particular secondary logical communications devices 206 at the outset of the communication session. Rather, the communication pathway between the primary communication device 204 and each of the secondary logical communications devices 206 may have an associated security assurance level, and the step of transmitting a communications session request to the primary logical communications device 204 may involve the primary logical communications device 204 providing the Application Server 108 with an assurance list that identifies the assurance levels associated with the secondary logical communications devices 206, and the Application Server 108 dynamically selecting one or more of the secondary logical communications devices 206 for the communications session in accordance with the associated assurance levels and the assurance level required by the Application Server 108 for the communications session.

Alternately, the Application Server 108 may specify the required assurance levels of the communications device 206 required for the communication session. The end-user can then proceed with the requested communication session by dynamically interfacing with the primary logical communications device 204 the secondary logical communications devices 206 that have the required assurance levels. If the required secondary logical communications devices 206 (or communications devices 206 having the requisite assurance levels) are not available, the Application Server 108 may proceed with the communication session upon receipt of satisfactory user credentials.

Controller Registration

Figure 4:
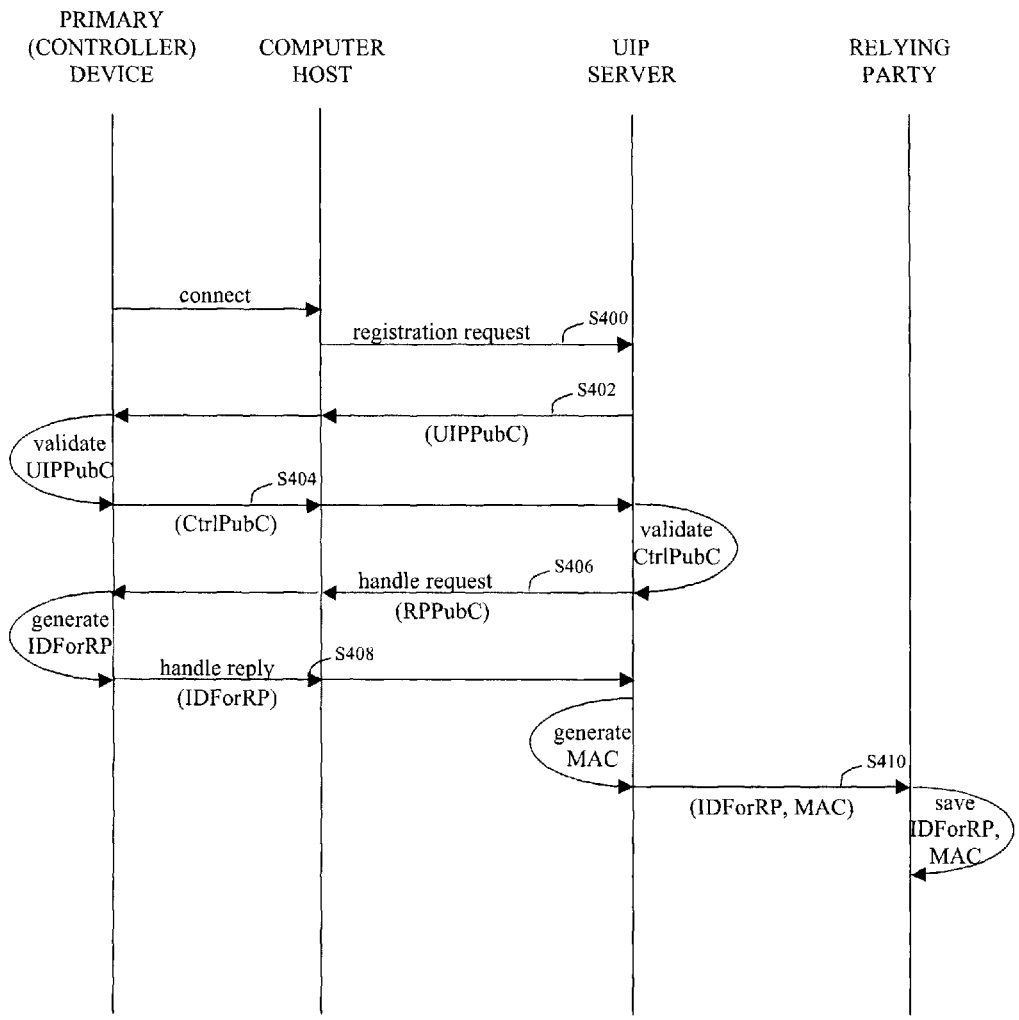
FIG. 4 is a message flow diagram that depicts the transmission of messages during a Controller Registration procedure that is implemented by a primary logical communications device.

The Controller Registration procedure that is implemented by the primary logical communications device 204 will now be described with reference to FIG. 4.

The Controller Registration procedure causes the primary logical communications device 204 to be provided with a unique User-Relying Party handle IDForRP for each Relying Party Server 104 that the user is authorized to access. For each Relying Party Server 104 that the user is authorized to access, the Controller Registration procedure also causes the Relying Party Server 104 to be provided with a copy of the respective User-Relying Party handle IDForRP and to bind the primary logical communications device 204 to the end-user by saving the User-Relying Party handle IDForRP in the end-user's profile in the Relying Party's User-Controller database. As will be explained, after execution of the Controller Registration procedure the end-user can authenticate to the Relying Party Server(s) 104 using the respective User-Relying Party handle(s) IDForRP and the Controller Public Certificate CtrlPubC.

The Controller Registration procedure may be initiated, at step S400, when the end-user interfaces the primary logical communications device 204 with the Computer Host 106 and uses the web browser of the Computer Host 106 to initiate a new session with the UIP Server 110. Optionally, the end-user may authenticate to the UIP Server 110 by providing the UIP Server 110 with the end-user's credentials (e.g. a card cryptogram, public certificate, chip & PIN, userID & password). The end-user then uses the web browser to initiate registration of the end-user's primary logical communications device 204.

In response, at step S402 the UIP Server 110 may provide the Computer Host 106 with the UIP Server Public Certificate UIPPubC for authentication of the identity of the UIP Server 110. The Computer Host 106 may then transmit the UIP Server Public Certificate UIPPubC to the primary logical communications device 204. The primary logical communications device 204 may validate the UIP Server Public Certificate UIPPubC by verifying that the UIP Server Public Certificate UIPPubC was signed by a root certificate authority.

If the UIP Server Public Certificate UIPPubC is valid, at step S404, the primary logical communications device 204 may transmit the Controller Public Certificate CtrlPubC to the Computer Host 106. The Computer Host 106 may then transmit the Controller Public Certificate CtrlPubC to the UIP Server 110. Optionally, the UIP Server 110 may validate the Controller Public Certificate CtrlPubC by verifying that the Controller Public Certificate CtrlPubC was signed by a root certificate authority.

The UIP Server 110 may establish a secure communications channel with the primary logical communications device 204 (via the Computer Host 106), and then query its Registered User database with the end-user's name (as specified in the Controller Public Certificate CtrlPubC) for the unique identifier RPID of the Relying Party Server(s) 104 that the end-user is authorized to access. At step S406, the UIP Server 110 may request from the primary logical communications device 204 a unique handle IDForRP for each Relying Party Server 104 that each end-user is authorized to access. To do so, the UIP Server 110 transmits over the secure communications channel a handle request message that includes the Relying Party Public Certificate RPPubC of each Relying Party Server 104 that each end-user is authorized to access. The Computer Host 106 then transmits the handle request message to the primary logical communications device 204.

Alternately, depending on the configuration of the primary logical communications device 204, instead of using the Computer Host 106 to initiate a new session with the UIP Server 110, at step S400 the end-user may use the primary logical communications device 204 to initiate registration of the primary logical communications device 204. The UIP Server 110 may respond by transmitting the UIP Server Public Certificate UIPPubC directly to the primary logical communications device 204, at step S402. The primary logical communications device 204 may then transmit the Controller Public Certificate CtrlPubC directly to the UIP Server 110, at step S404. In response, the UIP Server 110 may transmit the Relying Party Public Certificate(s) RPPubC directly to the primary logical communications device 204, at step S406.

Upon receipt of the registration request message, the primary logical communications device 204 may validate the Relying Party Public Certificate(s) RPPubC by verifying that each Relying Party Public Certificate RPPubC was signed by a root certificate authority. For each Relying Party Public Certificate RPPubC, the primary logical communications device 204 may generate a User-Relying Party handle IDForRP from the Controller Public Certificate CtrlPubC and the Relying Party identifier RPID of the associated Relying Party Server 104.

The primary logical communications device 204 may generate the User-Relying Party handle IDForRP by applying the Controller private encryption key CtrlPrivK and the Relying Party identifier RPID as inputs to an encryption (e.g. AES) algorithm. Optionally, the primary logical communications device 204 may sign the User-Relying Party handle IDForRP with the Controller identifier CtrlID.

The primary logical communications device 204 may save the User-Relying Party handle IDForRP and the associated Relying Party Public Certificate RPPubC. Since the User-Relying Party handle IDForRP is generated from the Controller private encryption key CtrlPrivK and the Relying Party identifier RPID, the User-Relying Party handle IDForRP is uniquely associated with the primary logical communications device 204 and the Relying Party Server 104.

At step S408, the primary logical communications device 204 may transmit to the Computer Host 106 a handle reply message that includes the (signed or unsigned) User-Relying Party handle IDForRP. The Computer Host 106 then transmits the handle reply message to the UIP Server 110. Alternately, depending on the configuration of the primary logical communications device 204, the primary logical communications device 204 may transmit the registration reply message directly to the UIP Server 110 at step S408.

If the primary logical communications device 204 is signed the User-Relying Party handle IDForRP, the UIP Server 110 may use the Controller Public Certificate CtrlPubC to verify the User-Relying Party handle IDForRP. The UIP Server 110 may then generate a message authentication code (MAC) using the User-Relying Party handle IDForRP and the Controller identifier CtrlID (included in the Controller Public Certificate CtrlPubC) as inputs to a suitable cryptographic hash algorithm (such as SHA-256). At step S410, the UIP Server 110 transmits the User-Relying Party handle IDForRP and the associated MAC to the Relying Party Server 104. The Relying Party Server 104 uses the end-user's name (as specified in the Controller Public Certificate CtrlPubC) to save the User-Relying Party handle IDForRP and MAC in the appropriate end-user profile of the Relying Party Server's User-Controller database.

The primary logical communications device 204 is thereby bound to the end-user via the User-Relying Party handle IDForRP. Thereafter, the end-user can authenticate to the Relying Party Server 104 or Application Server 108 by transmitting the User-Relying Party handle IDForRP and the Controller Public Certificate CtrlPubC to the Relying Party Server 104 (or Application Server 108). The Relying Party Server 104 (Application Server 108) may then generate a MAC using the User-Relying Party handle IDForRP and the Controller identifier CtrlID (included in the Controller Public Certificate CtrlPubC) as inputs to a suitable cryptographic hash algorithm, and may authenticate the end-user by comparing the generated MAC against the MAC stored in the end-user's profile of the Relying Party Server's User-Controller database.

In one variation, instead of the UIP Server 110 requesting a unique handle IDForRP from the primary logical communications device 204 at step S406, the UIP Server 110 may generate the handle IDForRP from the Relying Party identifier RPID, and transmit the handle IDForRP to the primary logical communications device 204 at step S406. In another variation, the UIP Server 110 may simply use the Controller identifier CtrlID (included in the Controller Public Certificate CtrlPubC) as the handle IDForRP. In yet another variation, instead of the Relying Party Server 104 using the Controller identifier CtrlID to authenticate the end-user, the Relying Party Server 104 may authenticate the end-user from the end-user's credentials.

Client Binding (Direct Connection)

Figure 5:
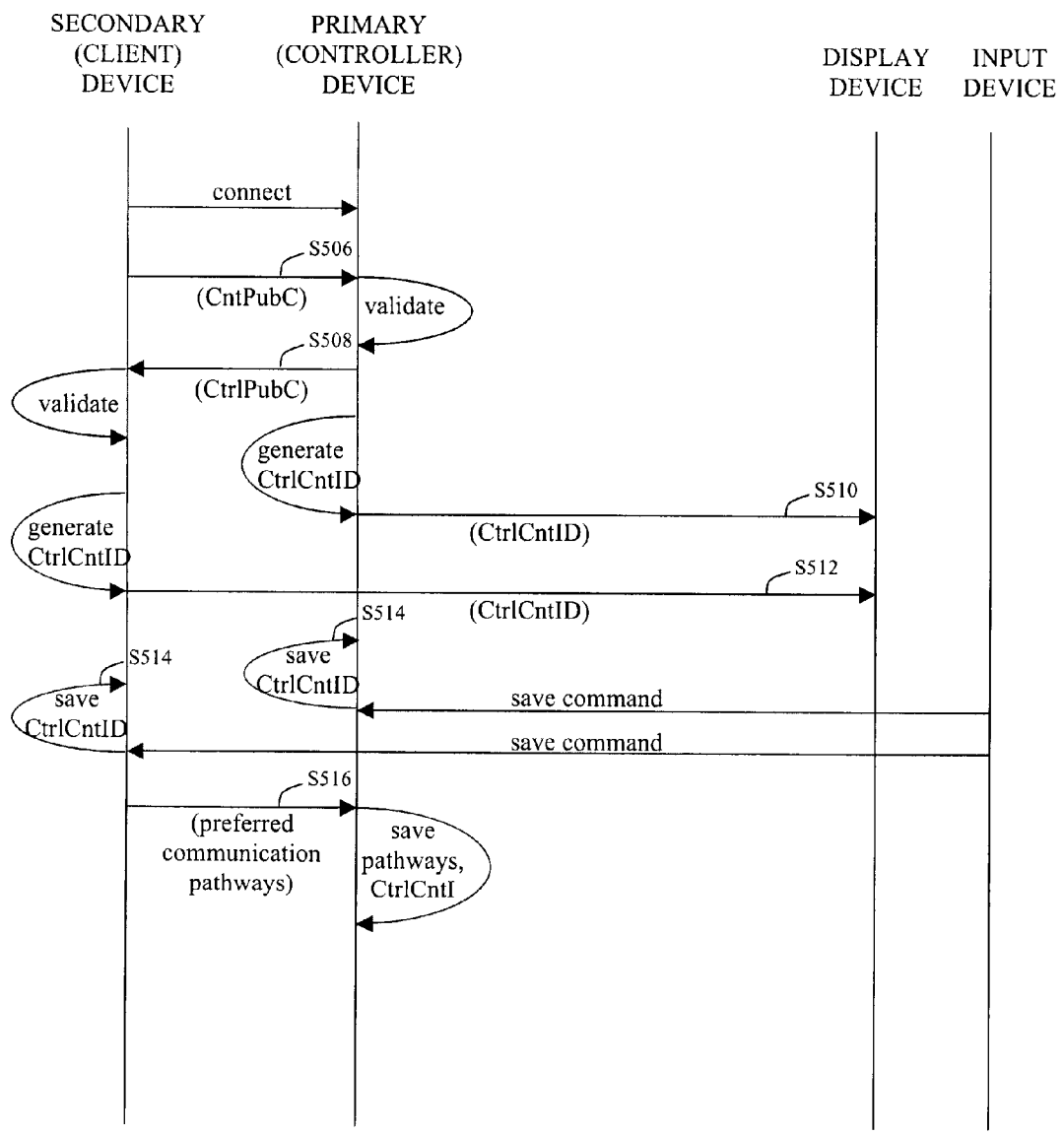
FIG. 5 is a message flow diagram that depicts the transmission of messages during a first embodiment of a Client Binding procedure that is implemented by ad-hoc communications network.

A first embodiment of the Client Binding procedure that is implemented by the primary logical communications device 204 and the secondary logical communications devices 206 will now be described with reference to FIG. 5. In this first embodiment, the secondary logical communications devices 206 directly connect to the primary logical communications device 204 via a wired or wireless interface.

The Client Binding procedure causes each secondary logical communications device 206 to be provided with a unique Controller-Client cryptographic code CtrlCntID. The Client Binding procedure also causes the primary logical communications device 204 to be provided with a copy of each Controller-Client cryptographic code CtrlCntID and thereby bind each secondary logical communications device 206 to the primary logical communications device 204. As will be explained, after execution of the Client Binding procedure the primary logical communications device 204 can use the Controller-Client cryptographic code CtrlCntID to authenticate the secondary logical communications device 206.

The first embodiment of the Client Binding procedure is initiated when the end-user directly (e.g. via a wired or wireless connection) interfaces one or more of the secondary logical communications devices 206 with the primary logical communications device 204. Upon detecting a connection to the primary logical communications device 204, the secondary logical communications device 206 may authenticate to the primary logical communications device 204 by providing the primary logical communications device 204 with the Client Public Certificate CntPubC, at step S506. The primary logical communications device 204 may validate the Client Public Certificate CntPubC by verifying that the Client Public Certificate CntPubC was signed by a root certificate authority.

Optionally, the primary logical communications device 204 may authenticate to the secondary logical communications devices 206 by providing the secondary logical communications device 206 with the Controller Public Certificate CtrlPubC, at step S508. The secondary logical communications devices 206 may validate the Controller Public Certificate CtrlPubC by verifying that the Controller Public Certificate CtrlPubC was signed by a root certificate authority.

Alternately, instead of using an asymmetric key-based scheme (e.g. Controller Public Key CtrlPubK, Controller Private Key CtrlPrivK) to authenticate, the logical communications devices 204, 206 may use a symmetric key-based (e.g. Pretty Good Privacy or "PGP") scheme to mutually authenticate. For example, the secondary logical communications device 206 may authenticate to the primary logical communications device 204 by signing an authentication message with the Client Private Key CntPrivK, encrypting the authentication request with a one-time Client symmetric key CntSymK, encrypting the Client symmetric key CntSymK with the Controller Public Certificate CtrlPubC, and transmitting the encrypted authentication request and the encrypted Client symmetric key CntSymK to the primary logical communications device 204, at step S506. The primary logical communications device 204 may authenticate the secondary logical communications device 206 from the encrypted authentication request, the Client symmetric key CntSymK, the Controller Private Key CtrlPrivK and the Client Public Certificate CntPubC.

Optionally, the primary logical communications device 204 may authenticate to the secondary logical communications devices 206 by signing an authentication message with the Controller Private Key CtrlPrivK, encrypting the authentication request with a one-time Controller symmetric key CtrlSymK, encrypting the Controller symmetric key CtrlSymK with the Client Public Certificate CntPubC, and transmitting the encrypted authentication request and the encrypted Controller symmetric key CtrlSymK to the secondary logical communications device 206, at step S508. The secondary logical communications device 206 may authenticate the primary logical communications device 204 from the encrypted authentication request, the Controller symmetric key CtrlSymK, the Client Private Key CntPrivK and the Controller Public Certificate CtrlPubC.

The primary logical communications device 204 then generates a Controller-Client cryptographic code CtrlCntID by applying the Controller public encryption key CtrlPubK (or the Controller symmetric key CtrlSymK) and the Client public encryption key CntPubK (or the Client symmetric key CntSymK) and optionally other cryptographic parameters as inputs to an encryption (e.g. AES) algorithm. At step S510, the primary logical communications device 204 transmits its Controller-Client cryptographic code CtrlCntID to a secondary logical communications (display) device 206 that has display capabilities.

Similarly, the secondary logical communications device 206 generates a Controller-Client cryptographic code CtrlCntID by applying the Client public encryption key CntPubK (or the Client symmetric key CntSymK) and the Controller public encryption key CtrlPubK (or the Controller symmetric key CtrlSymK) and optionally other cryptographic parameters as inputs to an encryption (e.g. AES) algorithm. At step S512, the secondary logical communications device 206 transmits its Controller-Client cryptographic code CtrlCntID to a secondary logical communications (display) device 206 that has display capabilities (need not be the same secondary (display) device used in step S510).

The display device 206 displays the Controller-Client cryptographic codes CtrlCntID. If the Controller-Client cryptographic code CtrlCntID generated by the primary logical communications device 204 matches the Controller-Client cryptographic code CtrlCntID displayed/generated by the secondary logical communications device 206, the end-user may use the Computer Host 106 or a secondary logical communications (input) device 206 that has input capabilities to send an appropriate completion message to the logical communications devices 204, 206 that generated Controller-Client cryptographic codes CtrlCntID. Upon receipt of the completion message, the logical communications devices 204, 206 save the Controller-Client cryptographic codes CtrlCntID (and any other cryptographic parameters that were used to generate the Controller-Client cryptographic codes CtrlCntID) in the respective protected memory 220, 230 at step S514.

Each secondary logical communications device 206 is thereby registered/bound to the primary logical communications device 204 via the Controller-Client cryptographic codes CtrlCntID. Thereafter, each secondary logical communications devices 206 can authenticate itself to the primary logical communications device 204 using the associated Controller-Client cryptographic code CtrlCntID. Similarly, the primary logical communications device 204 can authenticate itself to the secondary logical communications devices 206 using the associated Controller-Client cryptographic codes CtrlCntID.

At step S516, the secondary logical communications device 206 may transmit to the primary logical communications device 204 a list of communications methods that the secondary logical communications device 206 prefers to use to communicate with the primary logical communications device 204. The primary logical communications device 204 saves in the protected memory 220 the preferred communications methods/pathways of the secondary logical communications device 206, together with the Controller-Client cryptographic code CtrlCntID of the secondary logical communications device 206.

Each communications method/pathway has an associated security assurance level that is determined by the security of the communications method/pathway. For example, a direct wired connection to the primary logical communications device 204 would be more secure than a direct wireless connection. An encrypted communications channel to the primary logical communications device 204 would be more secure than an unencrypted communications channel. Therefore, the primary logical communications device 204 also assigns a respective security assurance level to each preferred communications method/pathway. A recommended standard for specifying assurance levels is defined in NIST Special Publication 800-63.

As will be explained below, if a computer server (e.g. the Application Server 108) thereafter seeks to initiate a communications session with one or more secondary logical communications devices 206, the computer server may require the secondary logical communications devices 206 provide a particular minimum security assurance level. Accordingly, the computer server may request that the primary logical communications device 204 provide the computer server with a list of the respective security assurance levels of the secondary logical communications devices 206 that are registered/bound to the primary logical communications device 204. The computer server can then proceed with the communications session by selecting the secondary logical communications devices 206 that meet the computer server's minimum security assurance level, request the end-user provide end-user credentials due to the inability of the secondary logical communications devices 206 to meet the computer server's minimum security assurance level, or abort the communications session altogether.

Client Binding (Indirect Connection)

Figure 6:
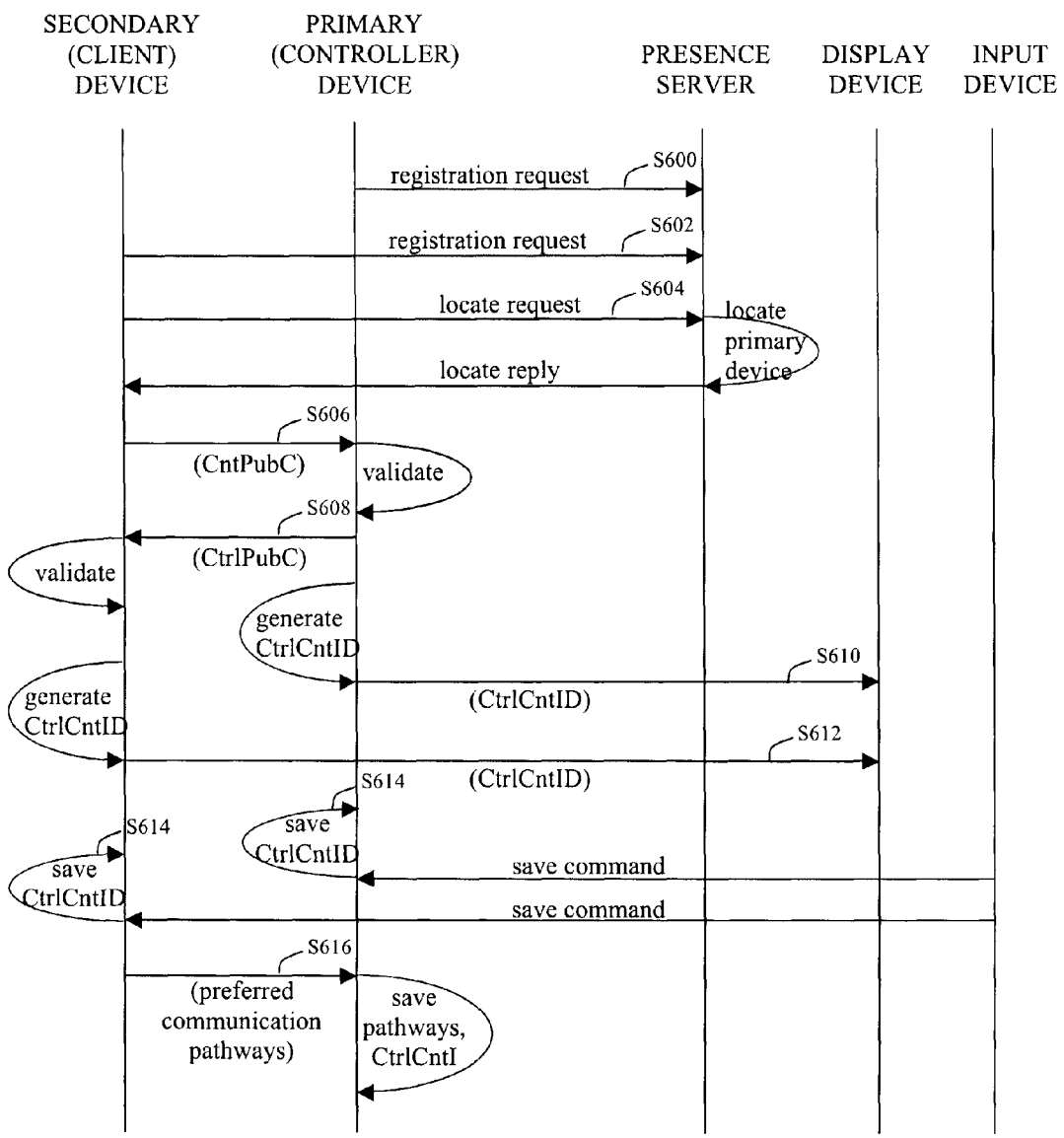
FIG. 6 is a message flow diagram that depicts the transmission of messages during a second embodiment of the Client Binding procedure.

A second embodiment of the Client Binding procedure that is implemented by the primary logical communications device 204 and the secondary logical communications devices 206 will now be described with reference to FIG. 6. In this second embodiment, the secondary logical communications devices 206 indirectly connect to the primary logical communications device 204 via the Presence Server 112.

The second embodiment of the Client Binding procedure is initiated when the end-user applies power to the primary logical communications device 204, whereupon the primary logical communications device 204 uses its unique Controller identifier CtrlID to register with the Presence Server 112, at step S600. The user also applies power to the secondary logical communications devices 206, whereupon the secondary logical communications devices 206 uses their respective unique Client identifier CntID to register with the Presence Server 112, at step S602.

The Presence Server 112 then allows the secondary logical communications devices 206 to locate the primary logical communications device 204, at step S604. To do so, the Presence Server 112 may relay messages between the primary logical communications device 204 and the secondary logical communications devices 206 (e.g. using a protocol such as XMPP or SIP). Alternately, the Presence Server 112 may facilitate a direct connection between the primary logical communications device 204 and the secondary logical communications devices 206 (e.g. using a protocol such as XMPP Jingle or SIP Simple).

Steps S606 through S616 correspond to steps S506 through S516. Accordingly, as discussed above, the secondary logical communications devices 206 may authenticate to the primary logical communications device 204 (and vice versa). The primary logical communications device 204 and secondary logical communications devices 206 may save a Controller-Client cryptographic code CtrlCntID in the respective protected memories 220, 230. The primary logical communications device 204 also assigns a respective security assurance level to each preferred communications method/pathway.

Session Initiation (Direct Connection)

Figure 7:
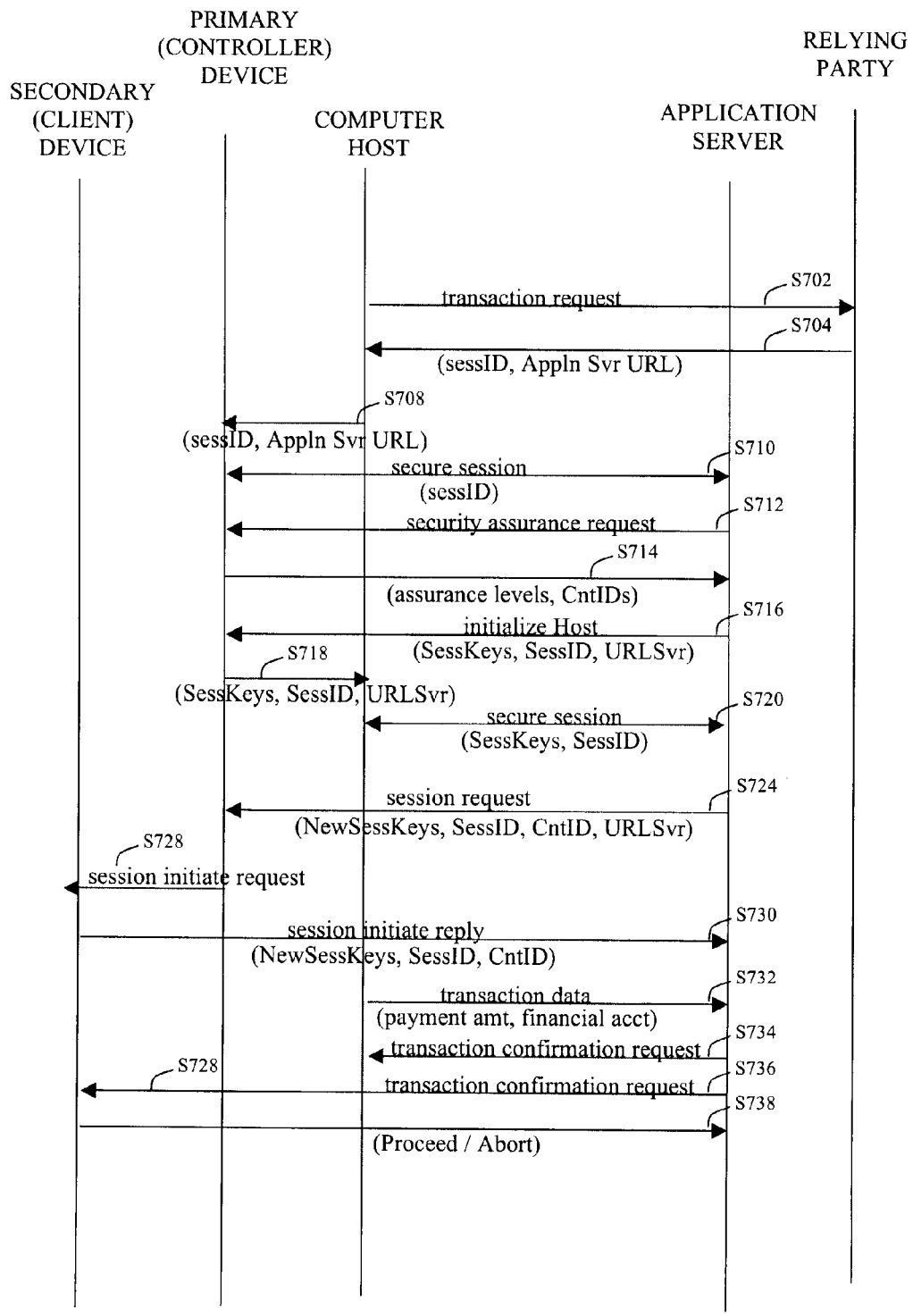
FIG. 7 is a message flow diagram that depicts the transmission of messages during a first embodiment of a Session Initiation procedure that is implemented by ad-hoc communications network.

A first embodiment of the Session Initiation procedure that is implemented by the session controller 224 of the primary logical communications device 204 and the session client 234 of the secondary logical communications devices 206 will now be described with reference to FIG. 7. In this first embodiment, the secondary logical communications devices 206 directly connect to the primary logical communications device 204 via a wired or wireless interface.

As discussed above, after execution of the Controller Registration procedure, the primary logical communications device 204 is configured with a unique User-Relying Party handle IDForRP for each Relying Party Server 104 that the end-user is authorized to access. The Relying Party Server 104 has a copy of the User-Relying Party handle IDForRP of each primary logical communications device 204, which the Relying Party Server 104 uses to register/bind primary logical communications devices 204 to the respective users. Further, after execution of the Client Binding procedure, the primary communications device 204 is provided with the unique Client identifier CntID and the unique Controller-Client cryptographic code CtrlCntID of each secondary logical communications device 206.

As will be explained below, in the Session Initiation procedure a primary logical communications device 204 receives a communications session request requesting a communications session between a computer server and one or more of the secondary logical communications devices 206 that are registered/bound to the primary logical communications device 204. After the session controller 224 receives the communications session request, the session controller 224 of the primary logical communications device 204 transmits a session initiate message to the specified secondary logical communications device(s) 206. After the session client 234 of each secondary logical communications device(s) 206 receives the session initiate message, the session client 234 transmits to the computer server a communications session reply that initiates a communications session with the computer server and identifies the secondary logical communications device 206 to the computer server.

The first embodiment of the Session Initiation procedure is initiated, at step S702, when the end-user interfaces the primary logical communications device 204 with the Computer Host 106 and uses the web browser of the Computer Host 106 to connect to the Relying Party Server 104. The end-user may then initiate an online transaction with the Relying Party Server 104. As used herein, an "online transaction" is any e-commerce or other electronic transaction (e.g. purchase of goods/services, bill payment, funds transfer, bank account or credit card balance query) that may be available to the Computer Host 106.

To complete the online transaction, the Relying Party Server 104 may require that the ad-hoc communications network 200 demonstrate that it is capable of providing a particular minimum security assurance level for the communications session. Therefore, optionally the Relying Party Server 104 may request that the primary logical communications device 204 advise the Application Server 108 of the security assurance levels of the secondary logical communications devices 206 of the ad-hoc communications network 200. In response, the primary logical communications device 204 may provide the Relying Party Server 104 with a list of the security assurance levels of the secondary logical communications devices 206 that are registered/bound to the primary logical communications device 204. The Relying Party Server 104 can then determine whether to proceed with the communication session based on the specified security assurance levels.

At step S704, the Relying Party Server 104 may provide the Computer Host 106 with a session token SessID for the communications session. If the Application Server 108 resides on a different computer server than the Relying Party Server 104, the Relying Party Server 104 may provide the Computer Host 106 with the network address (e.g. URL) of the Application Server 108. The Relying Party Server 104 may determine the network address of the Application Server 108 from the user credentials provided.

The end-user then uses the Computer Host 106 to wake the primary logical communications device 204 that the end-user intends to use for the communications session. At step S708, the Computer Host 106 may transmit the session token SessID and Application Server network address (if provided by the Relying Party Server 104) to the primary logical communications device 204.

The primary logical communications device 204 then attempts to establish a secure communications channel with the Application Server 108 (at the Application Server network address specified by the Relying Party Server 104, if provided). In response, the Application Server 108 may provide the primary logical communications device 204 with the Application Server Public Certificate ASPubC for authentication of the identity of the Application Server 108. The primary logical communications device 204 may validate the Application Server Public Certificate ASPubC by verifying that the Application Server Public Certificate ASPubC was signed by a root certificate authority.

If the Application Server Public Certificate ASPubC is valid, the primary logical communications device 204 may transmit the User-Relying Party handle IDForRP (of the Relying Party Server 104 to which the Computer Host 106 connected at step S702) and the Controller Public Certificate CtrlPubC to the Application Server 108.

The Application Server 108 may authenticate the end-user by generating a MAC using the User-Relying Party handle IDForRP and the Controller identifier CtrlID (included in the Controller Public Certificate CtrlPubC) as inputs to a suitable cryptographic hash algorithm, and comparing the generated MAC against the MAC stored in the end-user's profile of the Relying Party Server's User-Controller database. Optionally, the Application Server 108 may also validate the Controller Public Certificate CtrlPubC by verifying that the Controller Public Certificate CtrlPubC was signed by a root certificate authority.

The primary logical communications device 204 may then establish a secure communications channel with the Application Server 108, at step S710. The primary logical communications device 204 may transmit the session token SessID to the Application Server 108, over the secure communications channel.

The Application Server 108 then attempts to establish a secure communications channel with one or more secondary logical communications devices 206 that are registered/bound to the primary logical communications device 204. However, the Application Server 108 may require that the ad-hoc communications network 200 demonstrate that it is capable of providing a particular minimum security assurance level for the communications session. Therefore, before initiating the communications session, at step S712 the Application Server 108 may request that the primary logical communications device 204 advise the Application Server 108 of the security assurance levels of the secondary logical communications devices 206 of the ad-hoc communications network 200.

In response, at step S714 the primary logical communications device 204 may provide the Application Server 108 with a list of the security assurance levels and the associated Client identifiers CntID of the secondary logical communications devices 206 that are registered/bound to the primary logical communications device 204. The Application Server 108 can then select the secondary logical communications devices 206 that meet the minimum security assurance level required by Application Server 108.

Alternately, instead of requesting that the primary logical communications device 204 advise the Application Server 108 of the security assurance levels of the registered/bound secondary logical communications devices 206, at step S712 the Application Server 108 may advise the primary logical communications device 204 of the assurance levels required for the communication session. The end-user can then proceed with the requested communication session by dynamically directly connecting (e.g. via a wired or wireless connection) the primary logical communications device 204 with the secondary logical communications devices 206 that have the required assurance levels. The primary logical communications device 204 can then notify the Application Server 108 of the Client identifiers CntID of the connected secondary logical communications devices 206, at step S714.

If the secondary logical communications devices 206 cannot satisfy the minimum security assurance level required by Application Server 108 for the communications session, the Application Server 108 may abort the communications session altogether. Alternately, the Application Server 108 may request that the end-user authenticate to the Application Server 108 by providing the Application Server 108 with the end-user's credentials (e.g. a card cryptogram, public certificate, chip & PIN, userID & password) via the Computer Host 106 or a secondary logical communications device 206 that has the appropriate data input capabilities. The data input device may provide the Application Server 108 with the required end-user credentials via a secure channel established using public certificates, or by encrypting the end-user credentials using a symmetric key-based (e.g. Pretty Good Privacy or "PGP") scheme, as discussed above. If the Application Server 108 requires an end-user cryptogram, to enhance the integrity of the authentication process the Application Server 108 may provide the cryptogram input device with random data to be incorporated into the cryptogram.

If the minimum security assurance level required by Application Server 108 for the communications session is satisfied, the Application Server 108 generates session keys SessKeys for the communications session. Preferably, the session keys SessKeys comprise a symmetric key to be used by the recipient to encrypt messages sent to the Application Server 108, and another symmetric key to be used by the recipient to decrypt messages received from the Application Server 108. The Application Server 108 may also assign a session address URLSvr to the communications session. The Application Server 108 may then generate a host initialization message requesting a communications session with the Computer Host 106, and transmit the host initialization message to the primary logical communications device 204, over the secure communications channel, at step S716. The host initialization message may include the session keys SessKeys, the session token SessID, and optionally may also include the session address URLSvr.

The primary logical communications device 204 and the Computer Host 106 may then use a symmetric key-based (e.g. Pretty Good Privacy or "PGP") scheme to mutually authenticate. For example, the Computer Host 106 may authenticate to the primary logical communications device 204 by signing an authentication message with the Host Private Key HPrivK, encrypting the authentication request with a one-time symmetric key, encrypting the symmetric key with the Controller Public Certificate CtrlPubC, and transmitting the encrypted authentication request and the encrypted one-time symmetric key to the primary logical communications device 204. The primary logical communications device 204 may authenticate the Computer Host 106 from the encrypted authentication request, the one-time symmetric key, the Controller Private Key CtrlPrivK and the Host Public Certificate HPubC.

Optionally, the primary logical communications device 204 may authenticate to the Computer Host 106 by signing an authentication message with the Controller Private Key CtrlPrivK, encrypting the authentication request with a one-time symmetric key, encrypting the symmetric key with the Host Public Certificate HPubC, and transmitting the encrypted authentication request and the encrypted one-time symmetric key to the Computer Host 106. The Computer Host 106 may authenticate the primary logical communications device 204 from the encrypted authentication request, the one-time symmetric key, the Host Private Key HPrivK and the Controller Public Certificate CtrlPubC.

The primary logical communications device 204 may then use the one-time symmetric key(s) to established a secure communications channel with the Computer Host 106, at step S718. The primary logical communications device 204 may transmit the host initialization message (which includes the session keys SessKeys and the session token SessID, and optionally the session address URLSvr) to the Computer Host 106 over the secure communications channel.

At step S720, the Computer Host 106 may use the session keys SessKeys and the session token SessID to establish a secure communications session with the Application Server 108, at the session address URLSvr identified in the host initialization message. The Application Server 108 may then take over control of the browser of the Computer Host 106, and present the end-user with messages instructing the end-user to directly connect (e.g. via a wired or wireless connection) to the primary logical communications device 204 the secondary logical communications devices 206 that the Application Server 108 requires for the communications session (identified at step S714). After the required secondary logical communications devices 206 are connected, the end-user may use the Computer Host 106 to transmit a suitable message to the Application Server 108 within the secure communications session.

Further, if the security assurance level required by Application Server 108 has not yet been satisfied, the Application Server 108 may request that the end-user authenticate to the Application Server 108 by providing end-user credentials via the Computer Host 106 or a secondary logical communications device 206 that has the appropriate input capabilities. The secondary logical communications device 206 may provide the Application Server 108 with the required end-user credentials via a secure channel established using public certificates, or by encrypting the end-user credentials using a symmetric key-based (e.g. Pretty Good Privacy or "PGP") scheme, as discussed above. If the Application Server 108 requires an end-user cryptogram, to enhance the integrity of the authentication process the Application Server 108 may provide the cryptogram input device with random data to be incorporated into the cryptogram.

The Application Server 108 then generates a new set of session keys NewSessKeys for the communications session. As discussed above, preferably the session keys NewSessKeys comprise a pair of symmetric keys. The Application Server 108 then generates a communications session request message requesting a communications session with one or more of the secondary logical communications device 206, and transmits the communications session request to the primary logical communications device 204, over the secure communications channel, at step S724. The communications session request message includes the session keys NewSessKeys, the session token SessID, and the Client identifier(s) CntID of the secondary logical communications device(s) 204 that satisfy the minimum security assurance level required by Application Server 108. In addition, the communications session request message may include the session address URLSvr.

As will be appreciated, the end-user may have connected the required secondary logical communications devices 206 to the primary logical communications device 204 prior to step S716 (for example, the end-user may have connected the secondary logical communications devices 206 to the primary logical communications device 204, at step S714). Accordingly, steps S716 to S720 may be dispensed with if the required secondary logical communications devices 206 would normally be connected prior to step S716.

As discussed above, after execution of the Client Binding procedure, the primary communications device 204 saves in its protected memory 220 the unique Client identifier CntID and the associated unique Controller-Client cryptographic code CtrlCntID of each secondary logical communications device 206. Therefore, after receiving the communications session request, the primary logical communications device 204 may authenticate the secondary logical communications device(s) 206 (whose Client identifiers CntID were specified in the communications session request) by requesting each specified secondary logical communications device 206 provide the primary logical communications device 204 with its respective cryptographic code CtrlCntID, and then comparing each received cryptographic code CtrlCntID with the cryptographic code CtrlCntID that is associated with the secondary logical communications device 206 in the protected memory 220.

Optionally, the primary logical communications device 204 may authenticate to the specified secondary logical communications devices 206 by providing each specified secondary logical communications device 206 with the appropriate cryptographic codes CtrlCntID of the primary logical communications device 204.

If the specified secondary logical communications devices 206 are successfully authenticated, the primary logical communications device 204 generates a session initiate message requesting that each specified secondary logical communications device 206 initiate a communications session with the Application Server 108. Each session initiate message includes the session keys NewSessKeys and the session token SessID, and may also include the session address URLSvr.

The primary logical communications device 204 may also use the unique Controller-Client cryptographic code(s) CtrlCntID of the specified secondary logical communications device(s) 206 to establish secure communications channels with the specified secondary logical communications devices 206, at step S728. The primary logical communications device 204 then transmits the session initiate message(s) to the specified secondary logical communications device(s) 206, over the respective secure communications channel(s).

At step S730, each secondary logical communications device 206 that received a session initiate message replies to the Application Server 108 with a communications session reply message that initiates the requested communications session with the Application Server 108. To do so, each secondary logical communications device 206 that receives a session initiate message uses the session keys NewSessKeys and the session token SessID to establish a secure communications session with the Application Server 108, at the session address URLSvr specified in the session initiate message. Within each respective secure communications session, preferably the secondary logical communications device 206 identifies itself to the Application Server 108 by transmitting its Client identifier CntID to the Application Server 108.

At step S732, the Application Server 108 receives from the Computer Host 106 the transaction data (e.g. payment amount, financial account) for the online transaction that the Computer Host 106 initiated at step S702. At step S734, the Application Server 108 transmits to the Computer Host 106 a confirmation request that provides confirmation details (e.g. payment amount, financial account, merchant name) of the online transaction and requests that the end-user agree to proceed with the online transaction. The Application Server 108 also takes over control of the secondary logical communications devices 206, and displays the confirmation request on one or more of the secondary logical (display) communications devices 206 that have display capabilities, at step S736. The Application Server 108 also awaits input confirmation of the online transaction from one or more of the secondary logical (input) communications devices 206 that have input capabilities.

If the Computer Host 106 was compromised with rogue software that intercepted and manipulated the transaction data from the browser of the Computer Host 106 and/or the confirmation request from the Application Server 108, the confirmation details displayed on the display device of the Computer Host 106 will differ from the confirmation details displayed on the secondary logical (display) communications device(s) 206. The end-user can then abort the online transaction by transmitting a cancellation message from the secondary logical (input) communications device(s) 206 to the Application Server 108, at step S738.

Conversely, if the Computer Host 106 was not compromised with rogue software, the confirmation details displayed on the display device of the Computer Host 106 will match the confirmation details displayed on the secondary logical (display) communications device(s) 206. The end-user can then proceed with the online transaction by transmitting an authorization message from the secondary logical (input) communications device(s) 206 to the Application Server 108, at step S738.

In the foregoing example, the online transaction was initiated with the Relying Party Server 104 and was completed by the Application Server 108 and, therefore, the Relying Party Server 104 provided the Computer Host 106 with the network address of the Application Server 108. However, the Session Initiation procedure is not limited to this particular configuration. Rather, in one variation, the steps identified in the foregoing example as being performed by the Application Server 108 are instead performed by the Relying Party Server 104. In other variation, instead of the Session Initiation procedure terminating at step S738, the Relying Party 104 also provides the Application Server 108 with the transaction data and the session token SessID at step S704, and the Application Server 108 responds to the Relying Party 104 with a confirmation message (which includes the session token SessID) for the online transaction, after step S738.

Further, in the foregoing example, after the secondary logical communications devices 206 initiate the requested communications session(s) with the Application Server 108, the Application Server 108 only displayed a confirmation request on the Computer Host 106, and displayed the confirmation request and awaited input confirmation from, the secondary logical communications devices 206. Again, the Session Initiation procedure is not limited to this particular configuration. Rather, the Application Server 108 may execute any of a number of procedures on the Computer Host 106 and/or the secondary logical communications devices 206, including, without limitation:

Form fill into the browser (e.g. for payment or for user login)

Install cookies, security certificates or tokens (e.g. session certificates, normal certificates, signed tokens) into the browser Display contextual information to the user (e.g. overlays or toasts on the user's computer in or outside of their browser)

Request user authentication data for confirmation of the online transaction, for example via a PIN/Password or internal identity data, or via a cryptogram generated from a contact or contactless card interfaced with one of the secondary logical communications devices Send commands to a contact or contactless card interfaced with one of the secondary logical communications devices (e.g. read data or establish a secure channel to the card)

Request authentication against a PKI certificate or symmetric key stored within the ad-hoc communications network Session Initiation (Indirect Connection)

Figure 8:
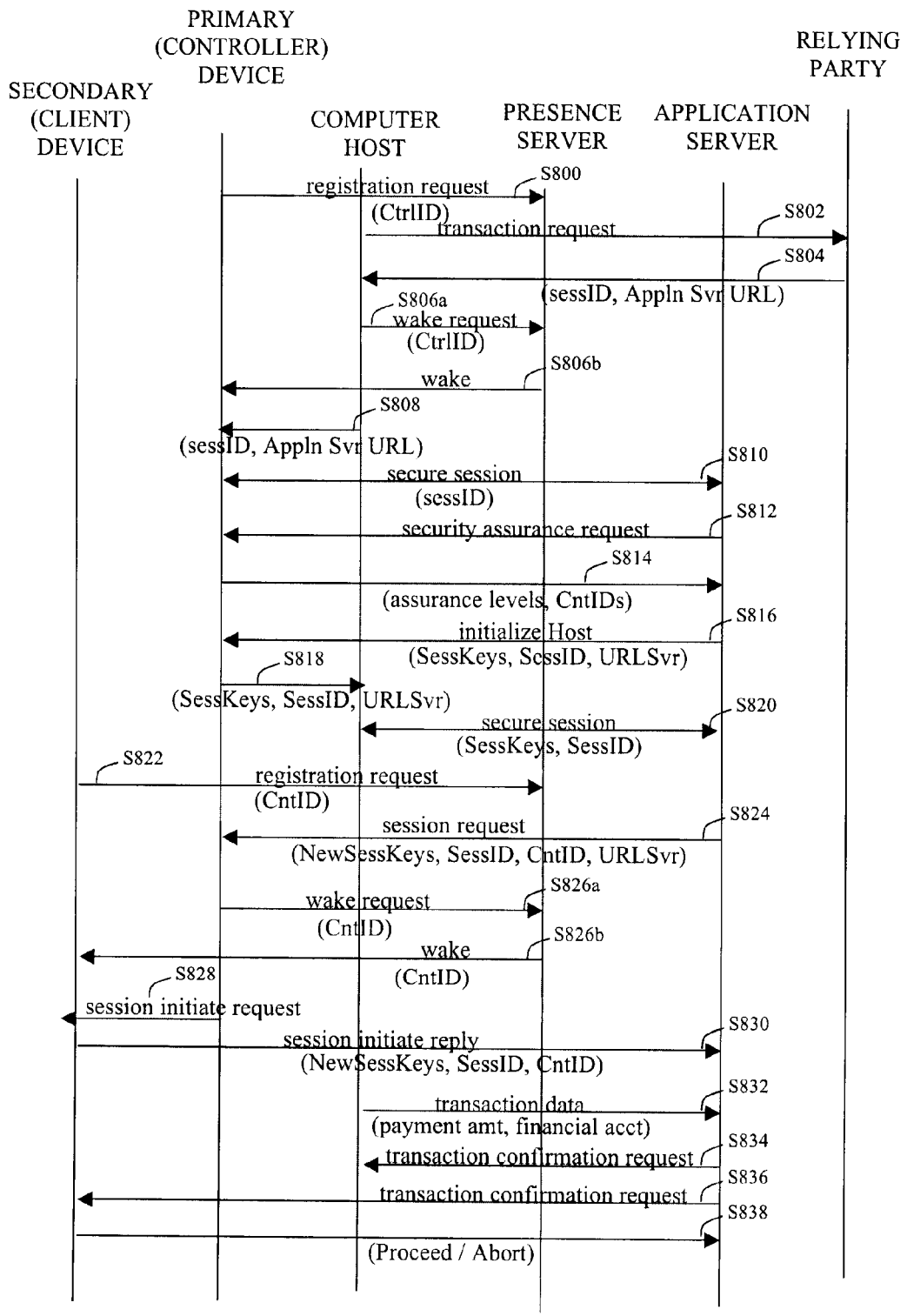
FIG. 8 is a message flow diagram that depicts the transmission of messages during a second embodiment of the Session Initiation procedure.

A second embodiment of the Session Initiation procedure that is implemented by the session controller 224 of the primary logical communications device 204 and the session client 234 of the secondary logical communications devices 206 will now be described with reference to FIG. 8. In this second embodiment, the secondary logical communications devices 206 indirectly connect to the primary logical communications device 204 via the Presence Server 112. Such an indirect connection is useful when it is not feasible or convenient to establish a direct connection between the primary logical communications device 204 and secondary logical communications device 206. The Presence Server 112 allows the primary logical communications device 204 and secondary logical communications device 206 to penetrate firewalls between them, and to find each other in a neutral network, such as the Internet.

The second embodiment of the Session Initiation procedure is initiated, at step S800, when the end-user applies power to the primary logical communications device 204, whereupon the primary logical communications device 204 uses its unique Controller identifier CtrlID to register with the Presence Server 112.

The end-user then uses the web browser of the Computer Host 106 to connect to the Relying Party Server 104, at step S802. The end-user may then initiate an online transaction with the Relying Party Server 104. To complete the online transaction, the Relying Party Server 104 may require that the ad-hoc communications network 200 demonstrate that it is capable of providing a particular minimum security assurance level for the communications session. Therefore, optionally the Relying Party Server 104 may request that Computer Host 106 advise the Application Server 108 of the security assurance levels of the secondary logical communications devices 206 of the ad-hoc communications network 200.

In response, the Computer Host 106 may provide the Relying Party Server 104 with a list of the security assurance levels of the secondary logical communications devices 206 that are registered/bound to the primary logical communications device 204. The Relying Party Server 104 can then determine whether to proceed with the communication session based on the specified security assurance levels.

At step S804, the Relying Party Server 104 may provide the Computer Host 106 with a session token SessID for the communications session. If the Application Server 108 resides on a different web server than the Relying Party Server 104, the Relying Party Server 104 may provide the Computer Host 106 with the network address (e.g. URL) of the Application Server 108. The Relying Party Server 104 may determine the network address of the Application Server 108 from the user credentials provided.

The Computer Host 106 then sends the Presence Server 112 a wake-up message requesting that the Presence Server 112 wake the primary logical communications device 204, at step S806a. The wake-up message includes the Controller identifier CtrlID of the primary logical communications device 204. The Presence Server 112 forwards the wake-up message to the primary logical communications device 204, at step S806b. The Presence Server 112 may thereafter relay messages between the Computer Host 106 and the primary logical communications device 204 (e.g. using a protocol such as XMPP or SIP). Alternately, the Presence Server 112 may facilitate a direct connection between the Computer Host 106 and the primary logical communications device 204 (e.g. using a protocol such as XMPP Jingle or SIP Simple).

Steps S808 through S818 correspond to steps S708 through S718. However, prior to step S814, the end-user may apply power to the secondary logical communications devices 206, to thereby cause the secondary logical communications devices 206 to use their respective unique Client identifiers CntID to dynamically register with the Presence Server 112. Accordingly, the primary logical communications device 204 can notify the Application Server 108 of the Client identifiers CntID of the indirectly connected secondary logical communications devices 206, at step S814.

At step S820, the Computer Host 106 may use the session keys SessKeys and the session token SessID to establish a secure communications session with the Application Server 108, at the session address URLSvr identified in the host initialization message. The Application Server 108 may then take over control of the browser of the Computer Host 106, and present the end-user with messages instructing the end-user to activate the secondary logical communications devices 206 that the Application Server 108 requires for the communications session (identified at step S814). The user may apply power to the secondary logical communications devices 206, whereupon the secondary logical communications devices 206 use their respective unique Client identifiers CntID to register with the Presence Server 112, at step S822 (if not already registered). After the required secondary logical communications devices 206 are registered, the end-user may use the Computer Host 106 to transmit a suitable message to the Application Server 108 within the secure communications session.

The Application Server 108 then generates a new set of session keys NewSessKeys for the communications session. As discussed above, preferably the session keys NewSessKeys comprise a pair of symmetric keys. The Application Server 108 then generates a communications session request message requesting a communications session with one or more of the secondary logical communications device 206, and transmits the communications session request to the primary logical communications device 204, over the secure communications channel, at step S824. The communications session request message includes the session keys NewSessKeys, the session token SessID, and the Client identifier(s) CntID of the secondary logical communications device(s) 204 that satisfy the minimum security assurance level required by Application Server 108. In addition, the communications session request message may include the session address URLSvr.

At step S826a, the primary logical communications device 204 sends the Presence Server 112 a wake/locate message requesting that the Presence Server 112 wake/locate the secondary logical communications device(s) 206 required by the communications session request. The wake/locate message includes the Client identifiers CntID specified in the communications session request. The Presence Server 112 forwards the wake-up/locate message(s) to the specified secondary logical communications device(s) 206, at step S826b. The Presence Server 112 may thereafter relay messages between the primary logical communications device 204 and the secondary logical communications device 206 (e.g. using a protocol such as XMPP or SIP). Alternately, the Presence Server 112 may facilitate a direct connection between the primary logical communications device 204 and the secondary logical communications devices 206 (e.g. using a protocol such as XMPP Jingle or SIP Simple).

At step S828, the primary logical communications device 204 may then use the unique Controller-Client cryptographic code(s) CtrlCntID of the specified secondary logical communications device(s) 206 to establish secure communications channels with the specified secondary logical communications devices 206 (facilitated by the Presence Server 112, as discussed above). The primary logical communications device 204 then transmits the session initiate message(s) to the specified secondary logical communications device(s) 206, over the respective secure communications channel(s).

Steps S830 through S838 correspond to steps S730 through S738.

The invention claimed is:

1. A method of ad-hoc network communications, comprising:
a computer server transmitting a communications session request to a primary logical communications device of a logical ad-hoc communications network, the ad-hoc communications network comprising the primary logical communications device and at least one secondary logical communications device registered to the primary logical communications device, the communications session request requesting a communications session with one of the at least one secondary logical communications devices, wherein a communication pathway between the primary communication device and each of the secondary logical communications devices has an associated security assurance level, and the transmitting a communications session request comprises the primary logical communications device providing the computer server with an assurance list identifying the assurance levels associated with the secondary logical communications devices, and the computer server selecting the one secondary logical communications device in accordance with the associated assurance level, wherein each of the assurance levels has requirements specified therefor in order to meet that assurance level;
upon receipt of the communications session request, the primary logical communications device transmitting to the one secondary logical communications device a session initiate message requesting the one secondary logical communications device initiate the communications session with the computer server; and
the one secondary logical communications device replying to the computer server with a communications session reply initiating the communications session and identifying the one secondary logical communications device to the computer server.

2. The method according to claim 1, wherein the communications session request includes a session key, and the one secondary logical communications device initiating the communications session comprises the one secondary logical communications device using the session key to open a secure communications channel with the computer server.

3. The method according to claim 1, wherein the transmitting a session initiate message comprises the primary logical communications device authenticating the one secondary logical communications device, and transmitting the session initiate message to the one secondary logical communications device in accordance with an outcome of the authenticating.

4. The method according to claim 3, wherein the primary logical communications device is configured with a cryptographic code of the one secondary logical communications device, and the authenticating the one secondary logical communications device comprises the primary logical communications devices authenticating the one secondary logical communications device with the cryptographic code.

5. The method according to claim 4, further comprising the primary logical communications device generating the cryptographic code from a cryptographic key associated with the primary logical communications device and a cryptographic key provided by the one secondary logical communications device.

6. The method according to claim 1, wherein the transmitting a session initiate message comprises the primary logical communications device opening a secure communications channel with the one secondary logical communications device, and transmitting the session initiate message to the one secondary logical communications device over the secure communications channel opened with the one secondary logical communications device.

7. The method according to claim 6, wherein the opening a secure communications channel with the one secondary logical communications device comprises the primary logical communications device opening the secure communications channel with the one secondary logical communications device via a presence server.

8. The method according to claim 7, wherein the opening a secure communications channel via a presence server comprises the one secondary logical communications device using a device identifier associated therewith to register with the presence server, and the primary logical communications device locating the one secondary logical communications device by transmitting to the presence server a location request comprising the device identifier.

9. The method according to claim 1, further comprising the computer server receiving transaction data of an online transaction, and transmitting a confirmation of the transaction data to the one secondary logical communications device via the communications session initiated by the one secondary logical communications device.

10. The method according to claim 9, wherein the computer server receives the transaction data from a computer host, and the transmitting a confirmation of the transaction data further comprises the computer server transmitting a confirmation of the transaction data to the computer host.

11. The method according to claim 1, wherein the communications session request includes a device identifier uniquely associated with the one secondary logical communications device, and the identifying the one secondary logical communications device to the computer server comprises the one secondary logical communications device replying to the computer server with the device identifier.

12. The method according to claim 1, wherein the communications session request includes a session identifier associated with the communications session, and the one secondary logical communications device initiating the communications session comprises the one secondary logical communications device replying to the computer server with the session identifier.

13. A logical ad-hoc communications network, comprising:
    a primary logical communications device; and
    at least one secondary logical communications device registered to the primary logical communications device,
    wherein the primary logical communications device is configured to, after receiving a communications session request from a computer server requesting a communications session with one of the at least one secondary logical communications devices, transmit to the one secondary logical communications device a session initiate message requesting the one secondary logical communications device initiate the communications session with the computer server, wherein a communication pathway between the primary communication device and each of the secondary logical communications devices has an associated security assurance level, and the transmitting a communications session request comprises the primary logical communications device providing the computer server with an assurance list identifying the assurance levels associated with the secondary logical communications devices, and the computer server selecting the one secondary logical communications device in accordance with the associated assurance level, wherein each of the assurance levels has requirements specified therefor in order to meet that assurance level, and
    the one secondary logical communications device is configured to reply to the computer server with a communications session reply initiating the communications session and identifying the one secondary logical communications device to the computer server.

14. A logical communications device of a logical ad-hoc communications network that comprises another logical communications device registered thereto, and comprising:
    a session controller configured to receive a communications session request from a computer server requesting a communications session with the another logical communications devices, and to transmit to the another logical communications device a session initiate message requesting the another logical communications device initiate the communications session with the computer server and identify the another logical communications device to the computer server, wherein a communication pathway between the logical communications device and each of the another logical communications devices has an associated security assurance level, and the communications session request comprises the logical communications device providing the computer server with an assurance list identifying the assurance levels associated with the another logical communications devices, and the computer server selecting the one another logical communications device in accordance with the associated assurance level, wherein each of the assurance levels has requirements specified therefor in order to meet that assurance level.

15. A non-transitory computer-readable storage medium carrying computer processing instructions stored thereon which, when executed by one logical communications device of a logical ad-hoc communications network comprising at least another logical communications device registered to the one logical communications device, configure the one logical communications device to, after receiving a communications session request from a computer server requesting a communications session with the another logical communications devices, transmit to the another logical communications device a session initiate message requesting the another logical communications device initiate the communications session with the computer server and to identify the another logical communications device to the computer server, wherein a communication pathway between the logical communications device and each of the another logical communications devices has an associated security assurance level, and the communications session request comprises the logical communications device providing the computer server with an assurance list identifying the assurance levels associated with the another logical communications devices, and the computer server selecting the one another logical communications device in accordance with the associated assurance level, wherein each of the assurance levels has requirements specified therefor in order to meet that assurance level.

16. A logical communications device registered to another logical communications device of a logical ad-hoc communications network, and comprising:
    a session client configured to receive from the another logical communications device a session initiate message requesting the logical communications device initiate a communications session with a computer server, and further configured to initiate the communications session with the computer server and identify the logical communications device to the computer server, wherein a communication pathway between the logical communications device and each of the another logical communications devices has an associated security assurance level, and the communications session request comprises the logical communications device providing the computer server with an assurance list identifying the assurance levels associated with the another logical communications devices, and the computer server selecting the one another logical communications device in accordance with the associated assurance level, wherein each of the assurance levels has requirements specified therefor in order to meet that assurance level, wherein the session initiate message includes a session key, and the session client is configured to initiate the communications session using the session key to open a secure communications channel with the computer server.

17. A non-transitory computer-readable storage medium carrying computer processing instructions stored thereon which, when executed by one logical communications device of a logical ad-hoc communications network comprising another logical communications device, configure the one logical communications device to, after receiving from the another logical communications device a session initiate message requesting the one logical communications device initiate a communications session with a computer server, initiate the communications session with the computer server and identify the one logical communications device to the computer server, wherein a communication pathway between the one logical communications device and each of the another logical communications devices has an associated security assurance level, and the communications session request comprises the one logical communications device providing the computer server with an assurance list identifying the assurance levels associated with the another logical communications devices, and the computer server selecting the one another logical communications device in accordance with the associated assurance level, wherein each of the assurance levels has requirements specified therefor in order to meet that assurance level, wherein the one logical communications device is registered to the another logical communications device, the session initiate message includes a session key, and the computer processing instructions configure the one logical communications device to initiate the communications session using the session key to open a secure communications channel with the computer server.

* * * * *